July 10, 1962

E. A. EDBERG 3,042,967

METHOD AND APPARATUS FOR MAKING FOAMED POLYMERIC STRUCTURES

Filed June 18, 1958

INVENTOR.
EDWIN A. EDBERG.
BY
Oscar B. Brumback.
his
ATTORNEY.

July 10, 1962   E. A. EDBERG   3,042,967
METHOD AND APPARATUS FOR MAKING FOAMED POLYMERIC STRUCTURES
Filed June 18, 1958   5 Sheets-Sheet 2

Fig. 2.

INVENTOR.
EDWIN A. EDBERG.
BY
Oscar B. Crumback
his
ATTORNEY.

July 10, 1962 E. A. EDBERG 3,042,967
METHOD AND APPARATUS FOR MAKING FOAMED POLYMERIC STRUCTURES
Filed June 18, 1958 5 Sheets-Sheet 3

Fig. 2a

INVENTOR.
EDWIN A. EDBERG.
BY
Oscar B. Brumback.
his ATTORNEY.

July 10, 1962 E. A. EDBERG 3,042,967
METHOD AND APPARATUS FOR MAKING FOAMED POLYMERIC STRUCTURES
Filed June 18, 1958 5 Sheets-Sheet 4

INVENTOR.
EDWIN A. EDBERG.
BY
Oscar B. Brumback
his
ATTORNEY.

INVENTOR.
EDWIN A. EDBERG.
BY
Oscar B. Brumback
his ATTORNEY

United States Patent Office 3,042,967
Patented July 10, 1962

3,042,967
METHOD AND APPARATUS FOR MAKING FOAMED POLYMERIC STRUCTURES
Edwin A. Edberg, Sewickley, Pa., assignor to Koppers Company, Inc., a corporation of Delaware
Filed June 18, 1958, Ser. No. 742,855
10 Claims. (Cl. 18—5)

This invention relates to an apparatus and method for making foamed polymeric structures and more particularly to an apparatus and method for making foamed polymeric boards or sheets.

Polymeric particles capable of being expanded by the application of heat are well known. A particularly useful process for making such expandable polymeric materials is described in the co-pending U.S. application of Gaetano F. D'Alelio, Serial No. 394,230, filed November 24, 1953, now Patent No. 2,983,692. According to this D'Alelio application, such expandable polymeric materials can be made from a variety of homopolymers and copolymers derived from hydrocarbon vinyl monomers. Such monomers are, for example, ethylene, styrene, nuclear dimethyl styrenes, isobutylene, vinyl naphthalene, etc. and such copolymers are, for example, styrene and butadiene, styrene and α-methyl styrene, styrene, butadiene and α-methyl styrene, styrene and isobutylene, styrene and dimethyl styrene, isobutylene and butadiene. Particular polymers described that are useful are polystyrene and its copolymers with such monomers as butadiene, α-methyl styrene and isobutylene. These expandable materials have incorporated therein from three to thirty parts by weight, an aliphatic or cyclo aliphatic hydrocarbon boiling in the range of 35° to 60° C. Suitable hydrocarbons include petroleum ether, pentane, hexane, heptone, cyclo pentane, cyclo hexane, cyclo pentadiene and esters thereof. Although the expandable particles are generically known as beads; they may be round, pillow-shaped or irregularly shaped.

These beads may be partially expanded prior to their further expansion into a final article. Particularly useful processes for partially expanding expandable polymeric materials are described in the co-pending U.S. applications of Hugh Rodman, Jr., Serial No. 689,195, filed October 9, 1957, now Patent No. 3,023,175 and Edwin A. Edberg and Richard H. Immel, Serial No. 705,540, filed December 27, 1957, now Patent No. 2,998,501, in which steam, hot gas, infrared and high frequency radio waves are used to partially expand the polymeric material.

Conventionally, foamed or cellular polymeric structures in the shape of boards or sheets have been made by charging expandable polymeric material in an elongated mold having a substantially closed rectangular cavity therein and applying to the mold external heat, such as with steam, until the material expands into a foamed polymeric structure corresponding to the rectangular shape of the mold cavity.

Difficulty has been encountered heretofore when applying steam externally to the mold in obtaining board of adequate thickness to meet the present requirements for thick board. For example, it is difficult to provide uniform heating of the beads and uneven heat transfer results in non-uniform expansion and poor fusion of the polymeric foam. This may be explained by the fact that some of the material close to the surface of the mold as it expands acts as an insulator for the portion which has not yet been expanded.

The methods known heretofore have been particularly inadequate for expanding the material in situ between conventional facing materials for making sandwich-type panels.

This invention contemplates an apparatus and method for producing polymeric structures, such as thick boards of polymeric material or polymeric-filled sandwich-type panels, by exposing polymeric particles in a molding cavity to steam injected from a steam source into the molding cavity for a predetermined length of time and then automatically removing the steam source from said cavity.

The above and further novel features of the invention will appear more fully from the following detailed description when the same is read in connection with the accompanying drawings. It is to be expressly understood, however, that the drawings are not intended as a definition of the invention but are for the purpose of illustration only.

Figures 1, 6:
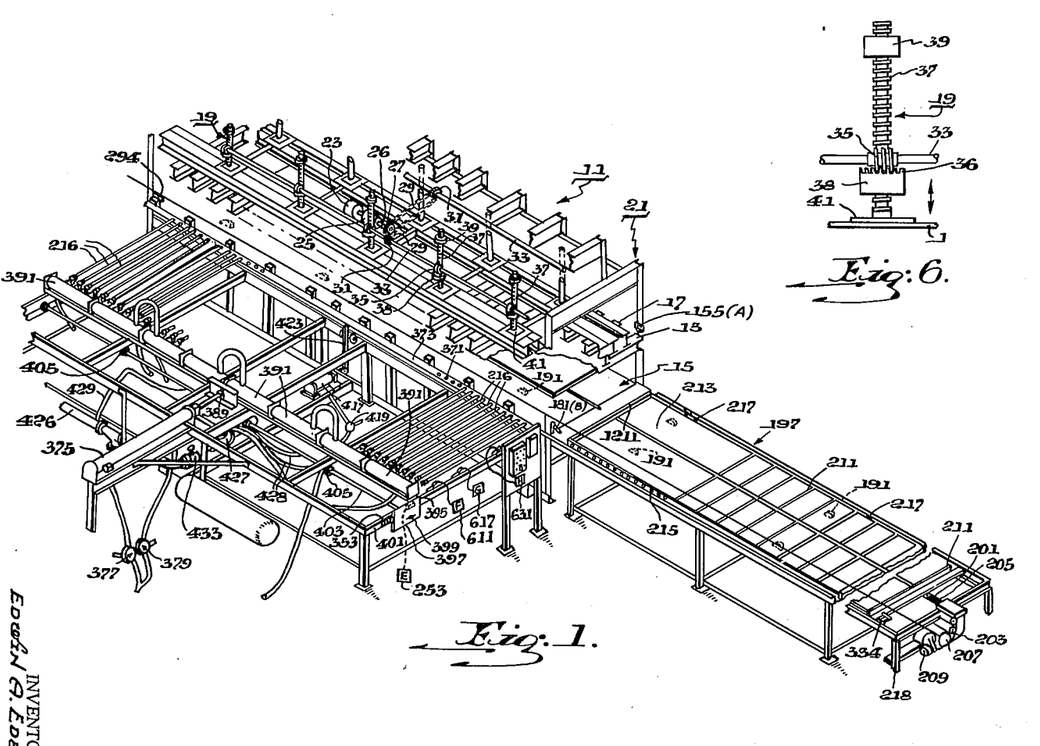
FIG. 1 is a partial cross-sectional view and an elevation of an embodiment of this invention.
FIG. 6 is a partial elevation of the screw jacks of FIG. 1.

Referring to FIG. 1, there is illustrated a press 11 which functions to form a molding cavity with moveable sides or a holding device to hold panels between which polymeric material is expanded. Press 11 has top and bottom sections 13 and 15 formed respectively from a plurality of interconnected I beams 17 arranged in lattice-like fashion. A plurality of conventional jacks 19 interposed between the top section 13 and a fixed supporting structure 21 raise and lower the top section 13 in relation to the bottom section 15.

Advantageously, screw jacks 19 (FIGS. 1 and 6) raise and lower top section 13 with respect to bottom section 15. To this end motor 23, by means of attachments mounted on top section 13, including a geared speed reducer 25, overload clutch 26, sprocket 27, chains 29, sprockets 31 and shafts 33, rotate worm gears 35 in meshing engagement with gears 36 which are located at one end of a sleeve 38 fixed to screws 37. Screws 37 rotate in sleeves 39 which are attached to rigid support 21. The internal threads of the sleeves 39 mesh with the external threads of the screws 37 so that when motor 23 rotates the gears 35, the screws 37 will be raised or lowered depending on the direction of rotation of the motor 23. It is understood that the motor 23, the worm gears 35, and the attachments in between these two elements, as well as top section 13, move up and down with screws 37 so that worm gears 35 are maintained in meshing engagement with gear 36 attached to screws 37 when the screws are moved up or down. Locking plates 41 connect the top section 13 with the screws 37 while allowing the screws to rotate in the locking plates. Thus, when the screws 37 are raised or lowered, the top section 13 is raised or lowered.

Figure 2:
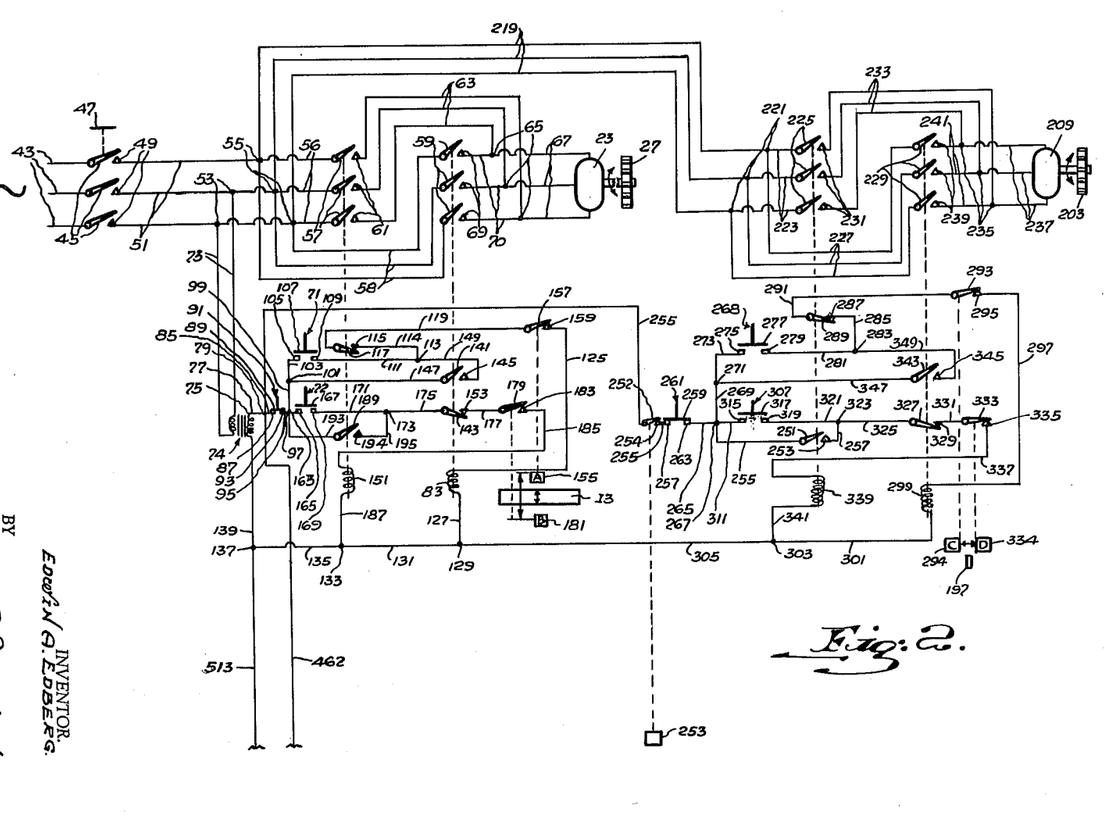
FIG. 2 is a schematic diagram of the control circuit for the movement of the top and table of FIGURE 1.

The circuit for actuating the reciprocation of top section 13 up and down is shown schematically in FIG. 2. Leads 43 supply three phase alternating current from a suitable source (not shown) to armatures 45 which, when engaged with contacts 49 by off-on switch 47, supply current through leads 51, junctions 53, junctions 55, and leads 56 to armatures 57 and from junctions 55 through leads 58 to armature 59. Armatures 57 and 59 are directional control armatures for motor 23. In the closed position, armatures 57 engage contacts 61 to supply current through leads 63, junctions 65, and leads 67 to motor 23 for rotation in one direction. Armatures 59, in the closed position, engage contacts 69 to supply current through leads 70, junctions 65 and leads 67 to motor 23 for rotation in the opposite direction. Rotation of motor 23, by the closing of armatures 57, lowers the top section 13 and rotation of motor 23 by the closing of armatures 59 raises the top section 13.

The opening and closing of armatures 57 and 59 with their respective contacts to rotate motor 23 selectively in one direction or the other is controlled by depressing push button 71 or 72. Power for this is supplied from junctions 53 through leads 73 to transformer 74 and from the secondary winding 75 of the transformer to lead 77 and junction 79.

To raise the top section 13, depressing push button 71 energizes relay coil 83 by supplying current from junction 79 to lead 85, contact 87, armature 89 of stop button 91, contact 93, lead 95, junction 97, lead 99, junction 101, lead 103, contact 105, armature 107 of push button 71, contact 109, lead 111, junction 113, lead 114, contact 115, normally closed armature 117, lead 119, normally closed armature 157 and contact 159 of limit switch 155, lead 125, relay coil 83, lead 127, junction 129, lead 131, junction 133, lead 135, junction 137, lead 139 and back again to secondary winding 75 to complete a circuit. The energization of relay coil 83 pulls downwardly armatures 59 to engage contacts 69 thereby supplying current to motor 23. Energization of relay coil 83 also pulls downwardly armatures 141 and 143. Armature 141 engages contact 145 to act as a holding switch for relay coil 83 so that current flows from junction 101 through lead 147, armature 141, contact 145, lead 149 and junction 113 to relay coil 83 to maintain the coil energized after releasing push button 71. Armature 143 acts as an interlock with armature 117 to prevent simultaneous closing of armatures 57 and 59. To this end the energization of relay coil 151, which disengages armature 117 and contact 115, can only take place to engage armatures 57 with contacts 61 when armature 143 engages contact 153; likewise the energization of relay coil 83, which disengages armature 143 and contact 153, can only take place to engage armatures 59 with contacts 69 when armature 117 engages contact 115.

To stop the upward movement of top section 13, push button 91 and limit switch 155 are provided for de-energizing motor 23. Depressing push button 91 disengages armature 89 from contact 93 opening the circuit and de-energizing the contact. This de-energizes relay coil 83 which disengages armature 59 from contact 69 to de-energize motor 23. Limit switch 155, as a safety device, stops the upward movement of the top section 13 when section 13 reaches a predetermined point. The top section 13 at this point contacts limit switch 155 which disengages armature 157 from contact 159 and de-energizes relay coil 83 to de-energize motor 23. Subsequent lowering of the top section re-engages armature 157 with contact 159.

To lower top section 13, depressing push button 72 energizes relay coil 151 by supplying current from junction 97 through lead 163, contact 165, armature 167, contact 169, lead 171, junction 173, lead 175, armature 143, contact 153, lead 177, armature 179 of limit switch 181, contact 183, lead 185, relay coil 151, lead 187, junction 133 and from there to secondary winding 75 of transformer 74 by the connections described above to complete a circuit. The energization of relay coil 151 pulls its armatures downwardly and thereby engages armatures 57 with contacts 61 to energize motor 23 in the opposite direction. Energization of relay coil 151 also pulls downwardly armatures 189 and 117, the latter armature acting as an interlock as described above. Armature 189 engages contact 194 to act as a holding switch for relay coil 151 so that current flows from junction 97 through lead 193, armature 189, contact 194, lead 195 and junction 173 to relay coil 151 by connections from junction 173, described above, to maintain relay coil 151 energized after releasing push button 72.

Push button 91 and limit switch 181 provide means for de-energizing motor 23 to stop the downward movement of the top section 13. To this end depression of push button 91 operates as described above to de-energize contact 93. This de-energizes relay coil 151 which disengages armatures 57 from contacts 61 to de-energize motor 23. Limit switch 181, as a safety device, stops the downward movement of top section 13. Lowering of the top section 13 to a predetermined point contacts limit switch 181 which disengages armature 179 from contact 183 and de-energizes relay coil 151 to de-energize motor 23 as described above. Subsequent raising of the top section re-engages armature 179 with contact 183.

The top 13 may contact a mold and thereby encounter resistance before contacting limit switch 181. Therefore, to prevent overloading of motor 23 when moving the top section 13 downwardly, the overload clutch 26 which is conventional is interposed between speed reducer 25 and sprocket 27 should the motor 23 not be de-energized soon enough when lowering top 13.

The mold between top and bottom sections 13 and 15 is formed by lowering the top section 13 as described on table 197. One side of the moveable table 197 has a plurality of equally spaced holes 215 therethrough to align and guide into cavity 213 steam probes 216, to be described in more detail hereinafter. The other side of table 197 has holes 217 for charging of the polymeric material into cavity 213 when the top section is lowered on dividers 211 of table 197. The manner of charging will also be described in more detail hereinafter. Conventional rigid dividers 211 are conveniently placed on the table at right angles to the two sides of the table. These are placed at either end of the table so that a substantially rectangular recess is formed in the table upon which the top section 13 is lowered to form a substantially closed molding cavity 213. These dividers may also be placed at various locations along the table as well as at the ends. In this manner a plurality of substantially closed rectangular molding cavities 213 are formed when the top section 13 is lowered on the table 197.

The table 197 is reciprocated on rollers 191 by means of a conventional chain 201, sprocket 203, linkage 205 and pulley 207 attached to the table 197. Motor 209 is mounted on extension 218 of bottom section 15 and attached to sprocket 203 by suitable means so that the motor 209 rotates in one direction to pull the table between the top and bottom sections 13 and 15 and in the other direction to pull the table out from therebetween.

This table rests on rollers 191 which are mounted in bottom section 15 and the extension 218 of the bottom section 15. The table is reciprocatable back and forth so that the top section may be lowered on the table to form the molding cavity 213 mentioned and so that the table 197 can be moved to a location adjacent the top 13 for easy placement of the dividers on the table and for easy removal of finished molded board therefrom.

The circuit for energizing motor 209 to reciprocate the table 197 is shown schematically in FIG. 2. Junctions 55 described above, supply current through leads 219, junctions 221 and leads 223 to directional control armatures 225 and from junctions 221 through leads 227 to directional control armatures 229. In the closed position armatures 225 engage contacts 231 to supply current through leads 233, junctions 235, and leads 237, to motor 209 for rotation of motor 209 in one direction. When armatures 225 open and armatures 229 close, the latter engage contacts 239 to supply current through leads 241, junctions 235, and leads 237 to motor 209 for rotation in the opposite direction. Thus the closing of armatures 229 rotates motor 209 to move the table 197 forward between the top and bottom sections 13 and 15 and when armatures 225 are closed motor 209 is reversed to remove the table 197 outward from between the top and bottom sections.

For controlling directional control armatures 225 and 229, transformer 74 supplies current to junction 79, as described above, and from there through lead 255 to armature 252 which is part of a limit switch 253. Armature 252 engages contact 254 when steam probes 216 are removed all the way from cavities 213 in a manner hereinafter described. This engagement of armature 252 with contact 254 energizes lead 255, contact 257, normally closed armature 259 of push button 261, contact 263, lead 265 and junction 267. As described hereinafter, armature 252 of limit switch 253 must engage contact 254 before the table 197 can be actuated forward or in reverse between top and bottom sections 13 and 15.

To actuate table 197 forward, depression of push button 268 supplies current from junction 267 through lead 269, junction 271, lead 273, contact 275, armature 277, contact 279, lead 281, junction 283, lead 285, contact 287, normally closed armature 289, lead 291, normally closed armature 293 of limit switch 294, contact 295, lead 297 to relay coil 299 and from there through lead 301, junction 303, lead 305 and junction 129 to transformer 74, as described above, to complete a circuit which energizes relay coil 299. Energization of relay coil 299 pulls its armatures downwardly thus engaging armatures 229 with contacts 239 to energize motor 209 in one direction. Energization of relay coil 299 also pulls downwardly armatures 343 and 327. Armature 343 engages contact 345 to act as a holding switch for relay coil 299 so that current to energize this relay coil flows from junction 271, described above, through lead 347, armature 343, contact 345, lead 349 and junction 283 to relay coil 299 by connections, as described above, after releasing push button 268. Armature 327 acts an an interlock with armature 289 to prevent the simultaneous closing of armatures 225 and 229 with their respective contacts. To this end the energization of relay coil 339, which disengages armature 289 from contact 287, can only take place to engage armatures 225 with contacts 231 when armature 327 engages contact 329; likewise the energization of relay coil 299, which disengages armature 327 from contact 329, can only take place to engage armatures 229 with contacts 239 when armature 289 engages contact 287.

To stop the forward movement of table 197, push button 261 and limit switch 294 are provided for de-energizing motor 209. To this end depression of push button 261 disengages armature 259 from contact 263, described above, to de-energize the latter contact. This de-energizes relay coil 299 which disengages armatures 229 from contacts 239 to de-energize motor 209, as described above. Limit switch 294, as a safety device, stops the forward movement of table 197. To this end the forward movement of table 197 to a pre-determined point contacts this limit switch 294 which disengages armatures 293 from contact 295 and de-energizes relay coil 299 to de-energize motor 209, as described above. Subsequent reversing of the table 197 re-engages armature 293 and contact 295.

To reverse the movement of table 197, depression of push button 307 causes current to flow from junction 267, described above, to lead 311, contact 315, armature 317, contact 319, lead 321, junction 323, lead 325, normally closed armature 327, contact 329, lead 331, armature 333 of limit switch 334, contact 335, lead 337 to relay coil 339 and from there through lead 341 to junction 303 and transformer 74, as described above, to complete a circuit which energizes relay coil 339. Energization of relay coil 339 pulls its armatures downwardly, thus engaging armatures 225 and contacts 231 to energize motor 209 in reverse. Energization of relay coil 339 also pulls downwardly armatures 251 and 289, the latter acting as an interlock, as described above. Armature 251 engages contact 253 to act as a holding switch for relay 339 so that current to maintain the relay coil energized flows from junction 267 through lead 255, armature 251, contact 253, lead 257 and junction 323 to relay coil 339 by connections from junction 323, as described above, after releasing push button 307.

Push button 261 and limit switch 334 provide means for de-energizing motor 209 to stop the outward or reverse movement of the table 197. To this end, depression of push button 261 operates, as described above, to de-energize contact 263. It is apparent from the above that this de-energizes relay coil 339 which disengages armatures 225 from contacts 231 to de-energize motor 209. Limit switch 334 operates as a safety device to stop movement of the table 197 in reverse. To this end reverse movement of table 197 to a predetermined point causes the table to contact limit switch 334 which disengages armature 333 from contact 335 which de-energizes relay coil 339 to de-energize motor 209. Subsequent inward or forward movement of the table re-engages armature 333 and contact 335.

The moving of table 197 inwardly all the way between the top and bottom sections, the table having dividers 211 suitably placed thereon, and the lowering of top 13 on the table readies the cavities 213 for filling of expandable polymeric material therein. Conveniently, an air actuated means 359 working on the same principle as an aspirator (FIG. 4) may be used to charge the cavity or cavities 213 mentioned. To this end a suitable air supply (not shown) forces air past nozzle 361 of the aspirator 359 to cause a suction at intake 363 which draws the polymeric material 365 from a suitable container (not shown) and charges it into the cavities 213 through holes 217.

It may be desirable for probes 216 to be placed in the cavities 213 before filling to prevent the polymeric material 365 from coming out the holes 215 during this filling operation. It will be understood from FIG. 1 that the probes 216 are supported at one end in holes 371 in plate 373 attached to the side of fixed structure 21 and when the table 197 is moved inwardly all the way against limit switch 294, as described above, holes 371 line up with holes 215 so that when actuated forwardly the probes pass through holes 215 and 371 into cavities 213. An air cylinder 375, having a suitable air source (not shown) provides the actuating force to move the probes from the position shown in FIGS. 1 and 2a through holes 215 part way into the cavities 213 to block the holes 215. To this end solenoid valves 377 and 379 interposed between the air source and the cylinder 375, control the direction of the probes 216 or stop the probes from further movement. The cylinder, when actuated as described hereinafter, transmits movement to the probes by means of a piston 385 (FIG. 2a), a piston rod 387, a linkage 389, and four inch steam headers 391 connected to and supporting the probes at the end of the probes opposite from the ends in holes 371. Beam 395 supports the headers 391 longitudinally and plate 397 having rollers 399 which ride on base 401 connect with the headers to support the headers for movement of the probes 216 into and out of cavities 213. Alignment rod 403 attached to plates 397 has rollers 405 which contact the beams of the base 401 to keep the movement of the probes aligned with the holes 371 and 215.

After the probes are inserted part way into cavities 213 for charging of cavities 213 and after the cavities are charged, suitable controls to be described hereinafter, actuate air cylinder 375 to force the probes all the way into the cavity 213. The inward speed of the probes is not critical but present practice is to move the probes inward slowly.

After the probes are inserted all the way in cavities 213 and after steam is injected therein, as described hereinafter, an air cylinder 417 having a solenoid valve 419 for controlling its actuation, breaks the probes loose from the cavity 213 by means of lever arm 423 which is wedged against the supporting beam 395 of the probes 216. Then cylinder 375 removes the probes all the way from cavities 213 and holes 215 at a speed rate of about four feet per half second until beam 395 hits limit switch 253 to close armature 252 with contact 254 which allows the table 197 to be removed from between top and bottom sections 13 and 15 after the top 13 is raised.

Figures 4, 4A, 5:
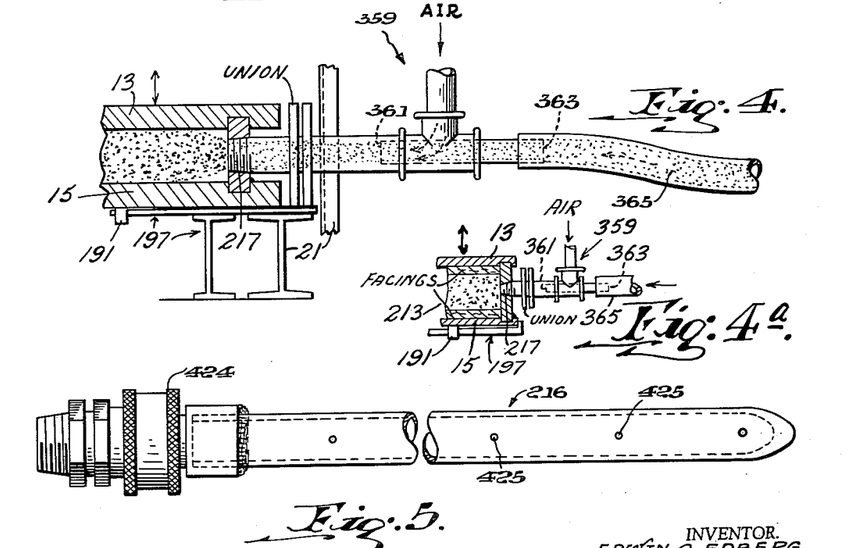
FIG. 4 is a partial cross-sectional view of a charging device used in FIG. 1.
FIG. 4a is a partial cross-sectional view of another arrangement of the charging device of FIG. 1 for making sandwich panels.
FIG. 5 is a partial cross-sectional view of the probes of FIG. 1.

In order to make the finished board from the polymeric material which is charged into cavities 213, steam is injected into cavities 213 through probes 216 which are best described with reference to FIG. 5. These probes are attached to conventional steam headers 391 at one end by means of a detachable fitting 424. The probes are made from elongated tube or pipe with the end opposite the end attached to the headers closed as by swedging. Intermediate its ends are a plurality of holes 425 which are advantageously spaced two inches apart on each side of the probes to direct horizontally. In the embodiment shown in FIG. 5, these holes 425 are $\frac{1}{16}$ inch in diameter but this dimension may be changed as long as the total area of all the holes doesn't exceed the total cross-sectional area of the inside of the tube. Thus steam can pass from the headers 391 through the probes 216 and out the holes 425 into cavities 213 under pressure.

A suitable source of steam under pressure (not shown) is connected to pipe 426. Solenoid 427 is provided which is connected to pipe 426 and to headers 391 by means of pipes 428 for selectively causing steam to flow through the headers and through the probes or to flow through pipe 429 to a drain which returns the steam to the steam source.

In order to properly expand the polymeric material charged into cavities 213, the steam injected into cavities 213 must heat the expandable material 365 at least to a temperature range wherein softening of the polymer occurs and wherein the alpihatic blowing agent causes expansion of the polymer. The steam, however, must not heat the expandable material to a temperature which melts the polymer. For proper expansion of the aliphatic hydrocarbon, the blowing agent, the latter as described in D'Alelio supra, should have a boiling range from 35° to 60° C. and comprises 3% to 30% by weight of the total weight of the expandable material. The upper and lower temperature limits for the proper expanding will vary with the polymeric material. For example, when expandable polystyrene is heated, the steam must cause a temperature of from about 100° to 125° C. to cause expansion and softening of the polymeric particles. Generally speaking, with regard to the upper limit, this temperature should not exceed about 135° to 150° C.

The required temperature also varies with the density of the expandable polymeric material. For example, when expandable polystyrene having a density of two pounds per cubic foot is heated, a temperature of about 110° C. is sufficient to soften the polymer and promote expansion. If the density of the material is decreased to about one pound per cubic foot, a temperature of about 120° C. is required.

For control purposes the temperature may be physically measured during the steam heating step. One advantageous way of doing this is to control the steam pressure injected into cavities 213 by means of a suitable gage attached to one of the steam probes. This pressure is advantageously maintained at approximately 35-40 p.s.i. by a conventional three inch adjustable Leslie control valve 433, model LLKY, made by the Leslie Company of Lindehurst, New Jersey, interposed between the steam source and the solenoid valve 427. The heat absorbed by the polymeric material per unit volume of material ultimately determines the temperature of the expandable material 365. Thus using the method of this invention, varying the time of injection of the steam in cavities 213 also varies the exposure temperature of the polymeric material 365.

It is understood that virgin polymeric material made by the process of D'Alelio supra may be used to charge cavities 213 or pre-expanded polymeric material capable of further expansion made by the process of Rodman or Edberg and Immel may be used to charge the cavities 213. Advantageously the pre-expanded material is used but the only difference in the process used for expanding the expandable or pre-expandable material is the amount of time of heating, the latter taking less time to expand.

Advantageously the steam probes are moved into cavities 213 at a speed rate of about one foot per second and removed at a speed rate of about 8 feet per second. It will be understood that the expansion of the beads takes place very rapidly when the steam is injected as described and thus it is very important to remove the steam probes quickly. It will also be understood that the time of steam injection varies with the density of the expanded material desired so this time may vary, for example, from about three seconds to fifteen seconds.

Figure 2A:
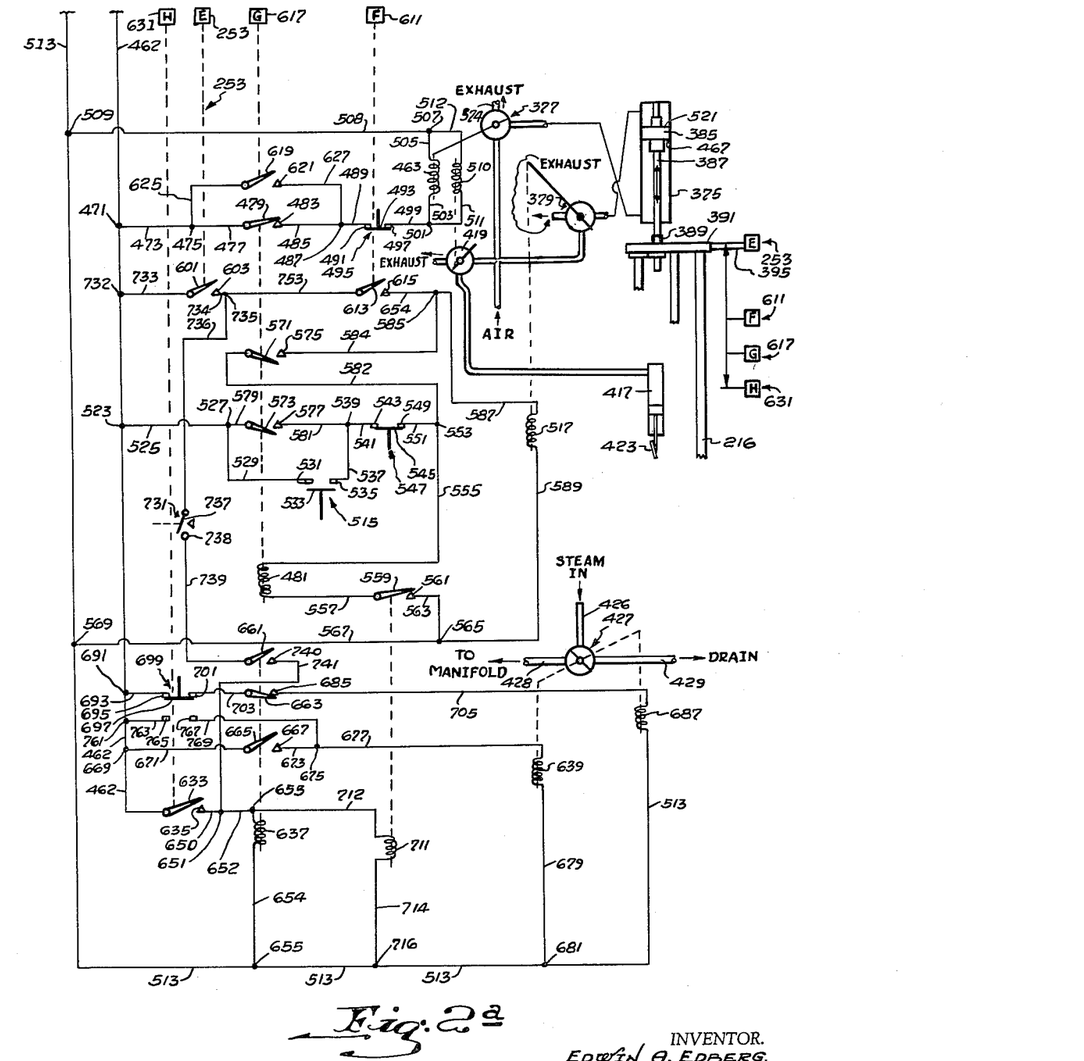
FIG. 2a is a schematic diagram of the control circuit for the movement of the probes and steam actuation of FIG. 1.
Figure 3:
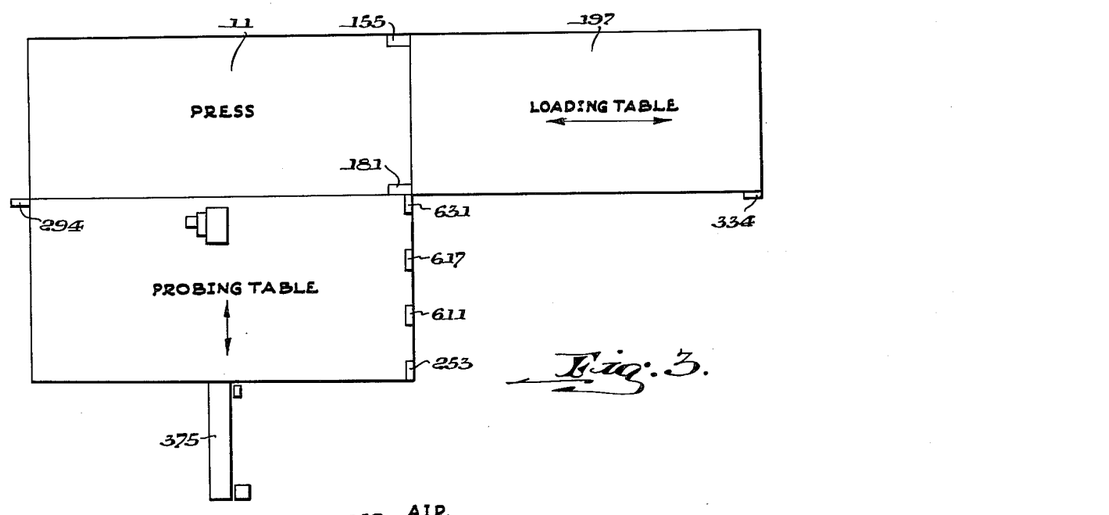
FIG. 3 is a top schematic view of elements of FIG. 1.

To best describe the control system for the reciprocation of the steam probes and the steam injection of this invention, reference to made to FIG. 2a which shows a control circuit with the steam probes retracted all the way from cavities 213. This circuit includes lead 462 which is connected to lead 462 of FIG. 2 and other connections to be described hereinafter. As shown in FIG. 2a, coil 463 actuates reverse solenoid valve 377 to apply pressure from a suitable source (not shown) to side 467 of piston 385 of cylinder 375 to hold steam probes 216 retracted all the way. To this end lead 462 supplies power to junction 471, lead 473, junction 475, lead 477, normally closed armature 479 of relay coil 481, contact 483, lead 485, junction 487, lead 489, contact 491, armature 493 of push button 495, contact 497, lead 499, junction 501, lead 503, coil 463, lead 505, junction 507, lead 508, junction 509, lead 513, and junction 137 (FIG. 2) to transformer 74 by connections described above. Breaking relay 510 is also energized from junction 501 through leads 511 and 512 when relay coil 463 is energized.

In order to move the probes inwardly, depression of push button 515 energizes forward relay coil 517 which actuates forward solenoid valve 379 to apply air pressure from a suitable source (not shown) to side 521 of piston 385. To this end lead 462, described above, supplies power to junction 523, lead 525, junction 527, lead 529, contact 531, normally open armature 533 of push button 515, contact 535, lead 537, junction 539, lead 541, contact 543, normally closed armature 545 of push button 547, contact 549, lead 551, junction 553, lead 555, relay coil 481, lead 557, time delay armature 559, contact 561, lead 563, junction 565, lead 567, junction 569, lead 513 to complete a circuit to transformer 74. It will be understood that energization of relay coil 481 in this manner pushes upwardly its armatures 479, 571 and 573. The disengagement of armature 479 from contact 483 deenergizes reverse relay coil 463 to actuate solenoid valve 377 to vent side 467 of piston 385 through exhaust 574 of solenoid valve 377. The closing of armature 571 and armature 573 with contacts 575 and 577 respectively energize forward relay 517 to actuate forward solenoid valve 379 to apply pressure to side 521 of piston 385. Armature 573 acts as a holding switch so that after releasing the push button 515 power is supplied from junction 527, previously described, through lead 579, armature 573, contact 577, lead 581, junction 539, lead 541, contact 543, armature 545, contact 549, lead 551, junction 553 to energize relay coil 481, as described above, and also to energize relay coil 517 from junction 553 through lead 582, armature 571, contact 575, lead 584, junction 585, lead 587, relay coil 517, lead 589, junction 565, lead 567, junction 569 and lead 513 to transformer 74 to complete a circuit. It is understood from the above that piston 385 has pressure supplied to side 521 of piston 385 through solenoid 379 and side 467 of piston 385 is exhausted through exhaust 574 of reverse solenoid valve 377; this causes the piston 385 and the steam probes 216 to move inwardly into cavities 213. A conventional valve adjustment (not shown) may be provided on exhaust 574 of solenoid valve 377 to control the speed of the inward movement of the probes.

The inward movement of the probes 216 disengages beam 395 from limit switch 253 which disengages previously described armature 252 from contact 254 and engages armature 601 with contact 603. Further inward movement of the probes 216 causes beam 395 to engage and then disengage limit switch 611 which engages and then disengages normally open armature 613 from contact 615. Still further inward movement of probes 216 causes beam 395 to contact limit switch 617 to close armature 619 with contact 621. The latter causes reverse relay coil 463 to be energized to cause the reverse solenoid valve 377 to apply pressure to side 467 of piston 385 to equal that applied to side 521 of piston 385 through solenoid valve 379; thus the pressure balance on both sides of piston 385 stops the inward movement of the probes 216. To this end when armature 619 engages contact 621, power is supplied from junction 475, described above, through lead 625, armature 619, contact 621, lead 627 and junction 487 to reverse relay coil 463 by the connections previously described.

The cavities 213 may be filled with polymeric material, as described above. After filling, the probes 216 are moved inward further by depressing push button 495 which disengages armature 493 from contact 497 which de-energizes reverse relay coil 463. It is understood from the above that by pressing push button 495 before beam 395 contacts limit switch 617, the probes 216 will move inwardly all the way without stopping.

The probes thus move inwardly until this movement is stopped by the engagement of beam 395 with a suitable stop such as plate 373. At this predetermined point of stopping, beam 395 contacts limit switch 631 to engage its armature 633 with contact 635 to energize relay coil 637. To this end power is supplied from lead 462 to armature 633, contact 635, lead 650, junction 651, lead 652, junction 653, relay coil 637, lead 654, junction 655, and lead 513 to transformer 74, as described above. The energization of relay coil 637 in this manner pulls downwardly its armatures 661, 663 and 665. The closing of armature 665 with contact 667 energizes steam manifold relay coil 639 from lead 462 through junction 669, lead 671, armature 665, contact 667, lead 673, junction 675, lead 677, steam manifold relay coil 639, lead 679, junction 681, and lead 513 to transformer 74 by connections described above. Simultaneously with the energization of steam manifold relay coil 639 armature 663 disengages from contact 685 to de-energize steam drain relay coil 687. It is understood that steam drain relay coil 687 is energized before energization of steam manifold relay 639 from lead 462 through junction 691, lead 693, contact 695, normally closed armature 697 of push button 699, contact 701, lead 703, normally closed armature 663, contact 685, lead 705, relay coil 687 and lead 513 to transformer 74.

The closing of limit switch 631 by the inward movement of the probes 216 also energizes time delay relay coil 711 to start a predetermined time cycle which ultimately returns the steam probes 216 to their most outward position. The Industrial Timer Corporation of Newark, New Jersey, manufactures a suitable time delay relay for this purpose, series TDAF 60S, 115 v., 60 cycle, 1000 w. To this end when armature 633 of limit switch 631 engages contact 635, current flows from armature 633 through contact 635, lead 652, junction 653, lead 712 to relay coil 711, lead 714, junction 716 and lead 513 to transformer 74 by connections described above to energize relay coil 711. After the elapse of the predetermined time delay cycle initiated by the energization of the time delay relay 711, armature 559 is moved upwardly. The latter causes relay coil 481 to be de-energized which causes its armatures to be moved downwardly. Thus the disengagement of armatures 573 and 571 from contacts 577 and 575, respectively, de-energizes forward relay coil 517 and the engagement of armature 479 with contact 483 energizes reverse relay coil 463 to pressurize side 467 of piston 385 and to vent side 521 of piston 385 through solenoid valve 379. The engagement of armature 479 with contact 483 in this manner also energizes breaking relay coil 510 which actuates solenoid valve 419 to pressurize air cylinder 417 from a suitable air source (not shown) to cause lever arm 423 to engage beam 395 to break the probes loose from cavities 213. The pressure differential across piston 385, described above, causes the probes 216 to continue to move outwardly which disengages beam 395 from limit switch 631. This causes armature 633 to disengage contact 635 which de-energizes relay coil 637 to move upwardly its armatures 665, 663 and 661. Thus armature 665 disengages contact 667 to de-energize steam manifold relay coil 639 and armature 663 engages contact 685 to energize steam drain relay coil 687 to actuate solenoid valve 427 so that steam no longer passes to the probes 216 but instead passes to steam drain pipe 429 for recycling to the steam source. If desired, the steam will remain on until the probes 216 are withdrawn all the way from cavities 213 by closing toggle switch 731. Thus when toggle switch 731 is closed steam probes 216 return outwardly all the way before the steam injection is stopped. To this end, before limit switch 253 is contacted, power is supplied from lead 462 to junction 732, lead 733, armature 601, contact 603, lead 734, junction 735, lead 736, armature 737, contact 738, lead 739, armature 661, contact 740, lead 741, junction 651, lead 652, junction 653, relay coil 637, lead 654, junction 655 and lead 513 to transformer 74.

When returning steam probes 216 outwardly from cavities 213 and before beam 395 contacts limit switch 253, beam 395 contacts limit switch 617 and limit switch 611. The former has no effect on the outward movement. The latter, however, momentarily energizes relay coil 517 from lead 462, described above, through junction 732, lead 733, armature 601, contact 603, lead 753, armature 613, contact 615, lead 587, relay coil 517 and lead 589 to transformer 74 by the connections from lead 589, described above. This causes solenoid valve 379 to pressurize side 521 of piston 385 momentarily to slow the backward movement of probes 216. The momentum of the probes causes the beam 395 to disengage limit switch 611 which de-energizes relay 517 to vent side 521 of the piston so that the probes continue their rearward movement at a lessened rate of speed. It is understood that the rearward speed of the probes may be controlled by a conventional valve adjustment (not shown) provided on the exhaust of solenoid valve 379.

Figure 7A:
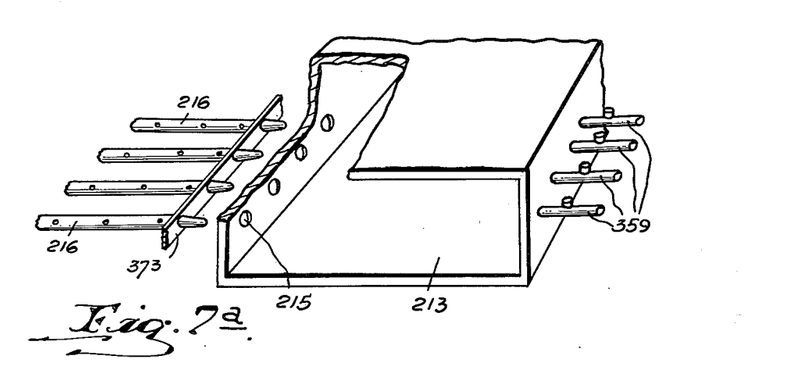
FIGURES 7a, b and c are a series of partial cross-sectional views showing the sequential relationship between the mold cavity, the steam probes and the feeding means.
Figure 7B:
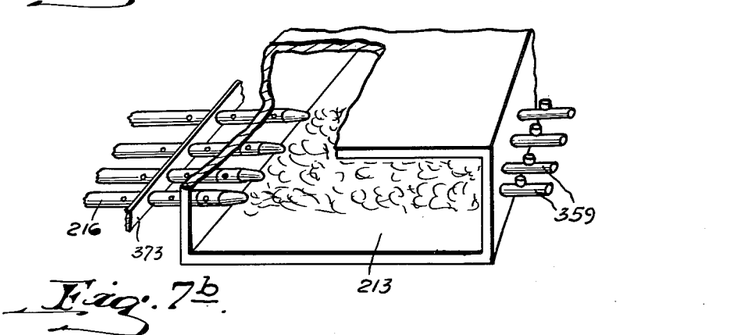

In operation, pre-expanded polystyrene beads of the type described in Rodman supra or Edberg and Immel supra are advantageously used to form the foamed polymeric structures of the invention. Top section 13 is in its raised position and table 197 is in its reverse position adjacent the top 13. Steam probes 216 are retracted to their most outward position so that supporting beam 395 for the steam probes 216 contacts limit switch 253 to close armature 252 with contact 254 and to open armature 601 and contact 603. Dividers 211 are placed at suitable locations on table 197 to form rectangular-shaped recesses whose dimensions are the same as the dimensions of the desired polymeric board. Advantageously these dividers are placed at either end of the table to form one long recess but a plurality of dividers may be used to form a plurality of smaller recesses for simultaneously forming a plurality of foamed polymeric boards whose dimensions correspond to those of the recesses. The first step in the molding sequence is to push off-on switch 47 which closes armature 45 with contacts 49 thereby supplying power to the control circuit. Push button 268 is then depressed which energizes relay coil 299 to close armatures 229 with contacts 239 and to energize motor 209 to move the table inwardly. After reaching a predetermined point, table 197 contacts limit switch 294 which disengages armature 293 from contact 295 to de-energize motor 209. This stops the inward movement of table 197 and lines up holes 215 in the side of table 197 with holes 371 in the supporting plate 373 which supports steam probes 216. Also in this position the table 197 is supported by rollers 191 attached to the fixed bottom section 15. Thereupon push button 72 is depressed to energize relay coil 151 which closes armature 57 with contact 61 to energize motor 23 in one direction so that top section 13 is lowered by jacks 19. When the top section 13 contacts the dividers 211 push button 91 is depressed to de-energize relay coil 151 and motor 23 to stop the downward movement of top section 13. A molding cavity is formed thereby between the top section 13 and the table 197 with the dividers 211 forming the ends of the molding cavities 213. At this point the steam probes are in the position shown in FIGURE 7a. Steam probes 216 are then inserted part way into cavities 213 (FIGURE 7b) to prevent the polymeric beads from spilling through holes 371 during the filling operation of the beads in cavities 213. To this end push button 515 is depressed actuating relay coil 517 and de-energizing relay coil 463, the latter relay coil being energized before energization of relay coil 517 by the closing of off-on switch 47. Energization of relay coil 517 actuates solenoid valve 379 to force air against side 521 of piston 385 of cylinder 375 to move the probes 216 inwardly. The inward movement of the probes causes the supporting beam 395 for the probes first to disengage limit switch 253 which engages normally open armature 601 with contact 603; second, to engage and then disengage limit switch 611 which engages and then disengages armature 613 from contact 615; and third, to contact limit switch 617 which engages armature 619 with contact 621. The latter energizes relay 463 which actuates solenoid valve 377 to pressurize side 467 of piston 385. This in turn causes a pressure balance across the piston 385 which stops the inward movement of steam probes 216.

At this point in the molding sequence with the probes inserted only part way into cavities 213 (FIGURE 7b), the cavities are filled with expandable polymeric material 365. This accomplished by forcing a measured amount of pre-expanded polystyrene beads from a suitable container (not shown) through intake 363, air aspirator 359 (FIG. 4) and holes 217 into cavities 213. The partially inserted probes keep the beads from spilling through holes 371 and 215.

Figure 7C:
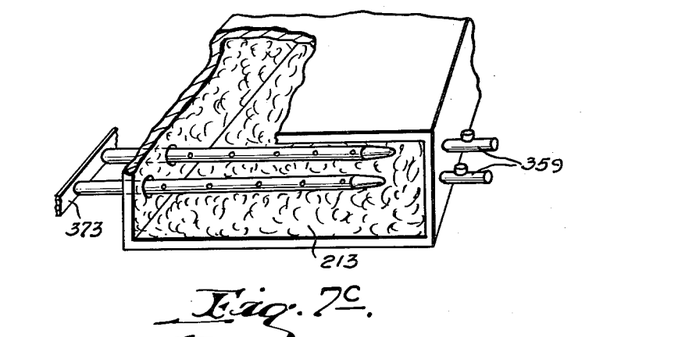

Then push button 495 is depressed. This de-energizes relay 463 to vent side 467 of piston 385. Thereupon steam probes 216 are moved inwardly further by the pressure against side 521 of the piston 385 until the probes are stopped by beam 395 hitting plate 373 (FIGURE 7c). At this point where the probes stop, beam 395 contacts limit switch 631 closing armature 633 with contact 635. This energizes relay coil 637 which engages armature 665 with contact 667 to energize relay coil 639 to actuate solenoid valve 427 to inject steam through steam probes 216 and holes 425 into cavities 213. The closing of armature 633 with contact 635 also energizes relay coil 711 to initiate a time delay control. This time control causes the steam injection to be stopped and the steam probes 216 to be removed at predetermined time intervals. To this end after an appropriate time interval elapses, from about three to fifteen seconds, relay coil 711 disengages armature 559 from contact 561. This de-energizes relay coils 481 and 517 and also energizes relay coils 463 and 510. The energization of relay coil 510 actuates solenoid valve 419 to pressurize cylinder 417 which actuates lever arm 423 against beam 395 to break the probes 216 loose from the cavities 213. Energization of relay coil 463 causes pressurization of side 467 of piston 385 through solenoid valve 377 and venting of side 521 of piston 385 through solenoid valve 379. This pressure differential on the piston 385 moves the probes outwardly from the cavities 213 until beam 395 disengages limit switch 631 which opens armature 633 from contact 635 to de-energize relay coils 637 and 711. De-energization of relay coil 711 allows armature 559 to return to a closed position with contact 561. De-energization of relay coil 637 closes armature 663 with contact 685 and disengages armature 665 from contact 667 which causes the actuation of solenoid valve 427. This in turn causes the steam injection to the probes 216 to be stopped and the steam from pipe 426 to be returned to the steam source through drain pipe 429. The steam will continue to be injected into cavities 213 after limit switch 731 is disengaged by beam 395 if toggle switch 731 is pressed to engage armature 737 with contact 738. Thus current is supplied to relay coil 637 to cause the steam injection through probes 216 until beam 395 in its outward movement contacts limit switch 253 to disengage armature 601 from contact 603. Depressing of push button 699 also causes the steam injection through probes 216 to stop at any time if otherwise desired. To this end, when armature 663 engages contact 685 to energize relay coil 687 across push button 699, depression of the push button de-energizes contact 701 to de-energize relay coil 687 and energize relay coil 639 from lead 462 through junction 761, lead 763, contact 765, armature 697, contact 767, lead 769, junction 675 and lead 677 to relay coil 639 and transformer 74.

The pressure differential on piston 385 mentioned above which moves the probes outwardly from cavities 213 and which ultimately causes the stopping of the steam injection, as described, continues to move the probes outwardly until beam 395 contacts limit switch 611. This engages armature 613 with contact 615 to momentarily energize relay coil 517 through armature 601 which is closed at this time, as described above. This causes momentary pressurization on side 521 of piston 385 which tends to slow the outward movement of the probes 216. The momentum of the probes, however, causes beam 395 to disengage limit switch 611 so that side 521 of piston 385 is vented again through solenoid valve 379 and the probes 216 continue their outward movement until the piston reaches its maximum outward movement, as described above. It will be understood that the energization of relay coil 517 is momentary while relay coil 463 remains energized because armature 571 is disengaged from contact 575 at this point. If the latter were not so, relay coil 481 would otherwise be energized by the closing of armature 613 of limit switch 611 with contact 615. Thus the probes are retracted outwardly all the way.

After the steam probes are retracted to their most outward position, beam 395 again contacts limit switch 253 which closes armature 252 with contact 254 which disengages armature 601 from contact 603. Then push button 71 is depressed which energizes relay coil 83 to close armature 59 with contact 69. This energizes motor 23 to raise top 13. Then push button 307 is depressed which energizes relay coil 339, closing armatures 225 with contacts 231. This energizes motor 209 to reverse the table 197 out from between top and bottom sections 13 and 15, respectively, to a position adjacent top 13. Finally the expanded polymeric structure is removed from the table 197 and another cycle, as described above, may be begun.

In summary of the above operation, the sequence of this invention is as follows: Dividers 211 are placed at suitable locations on table 197, off-on switch 47 is depressed, and then push button 268 is depressed which moves the table 197 inwardly. The table contacts limit switch 294 which stops its inward movement and push button 72 is depressed to lower the top section 13. When the top section contacts the dividers 211 or facing sheets, as described hereinafter, push button 91 is depressed to stop the downward movement of the top section 13. Push button 515 is then depressed to move the probes 216 inwardly until beam 395 contacts limit switch 617 which stops the inward movement of the probes. The cavities 213 are then filled with polymeric material, advantageously pre-expanded polystyrene capable of further expansion. Then push button 495 is depressed to move the probes inwardly until stopped by beam 395 hitting plate 373. At this point of stopping, beam 395 contacts limit switch 631 which causes steam to be injected through the probes into cavities 213 and also to initiate a time delay sequence which ultimately returns the probes outwardly again and shuts off the steam injection. To this end air cylinder 417 actuates lever 423 to break the probes loose from cavities 213 which causes the steam injection to be stopped. Air cylinder 375 also helps break the probes loose from the cavities 213 and moves the probes to their most outward position. When returning to their most outward position, the outward movement is slowed down momentarily when beam 395 contacts limit switch 611. Then the probes are further removed so that beam 395 contacts limit switch 253 to allow the reversing of the table outwardly. Push button 71 is depressed, moving the top section upwardly, then push button 91 is depressed, stopping the upward movement of the top section 13. Thereafter, push button 307 is depressed, moving the table outwardly and push button 261 is depressed to stop the outward movement of the table 197. The finished board is then removed from the table and a new sequence is begun.

By placing on table 197 top and bottom panel facing materials having dividers 211 interposed therebetween to form rectangular cavities, the apparatus and process of this invention can produce sandwich-type panels as well as solid foamed polymeric boards as described above. The facing materials include both flexible and rigid sheets. Flexible sheets suitable for the preparation of the various panel structures of the invention include such materials as kraft paper, polymeric sheets, i.e., cellophane, polyethylene, high impact polystyrene and the like and various metallic foils, i.e., aluminum foil. Similarly various flexible materials presently used as components of container structures can be used herein. Examples of these materials include jute paper board, chip paper board, manila paper board, straw paper board, and the like. Rigid sheets include plywood, light gage aluminum, light gage steel, hardwood board, vegetable fiber boards, cement-asbestos boards, gypsum boards, phenolic-type resin-impregnated laminates and the like.

The opposed surfaces of the facing material are coated with an adhesive in a conventional manner to provide adherence between the cellular polymeric structure and the facing material. Various adhesives can be used herein. For example, with kraft paper a conventional starch adhesive or optionally, one modified with a urea-formaldehyde or resorcinol-formaldehyde resin to enhance water resistance works quite well. Alternately, such adhesives as sodium silicate, polyvinyl alcohol, asphalt (molten or in an emulsion) resorcinol-formaldehyde resins, phenol-modified resorcinol-formaldehyde resins, polystyrene lattices, and the like can be used. Generally speaking, elastomeric-type adhesives are quite suitable. After such facing materials are coated and placed in position on table 197, the table is moved inwardly between the top and bottom sections 13 and 15, the top is lowered to contact the facing materials and steam is injected in the cavities 213 provided between the facings by the dividers 211, as described above. Thereafter, the panels having a foamed polymeric core are removed by raising the top 13 and moving the table outwardly therefrom, as described above.

The finished foamed polymeric board or sandwich panel becomes fire retardant by coating the expandable polymeric beads with various materials before filling the beads into the cavities 213. Avantageously for this purpose the beads are coated with a paste comprising between 30–50% by weight water and containing between 10–30 parts by weight based on the weight of said beads of a chlorinated aliphatic hydrocarbon containing at least 65% by weight chlorine and 2.5 to 20 parts by weight based on the weight of said beads of antimony oxide. Halowax brand chlorinated naphthalene may also be used instead of antimony oxide.

The apparatus and process of this invention make possible the manufacture of foamed polymeric board and sandwich panels having foamed polymeric material cores by the injection of steam into the molding cavities provided and the finished board and sandwich panels have adequate thickness to meet present demands. Furthermore, by using this novel apparatus and process with semi-automatic remotely operated controls, the board and sandwich panels are made more expeditiously and efficiently than was possible heretofore.

What is claimed is:

1. Automatic apparatus for forming foamed polymeric structures from expandable polymeric material, comprising a mold having movable top and bottom portions and first and second opposite sides, said first side having at least one first hole therethrough, said second side having second holes therethrough, an air actuated means for forcing said expandable polymeric material through said first hole so as substantially to fill said mold with said expandable polymeric material, a plurality of hollow steam probes each having an inlet and a plurality of small spaced outlet holes, said steam probes being insertable in said mold through said second holes so as substantially to close said mold thereby to keep said expandable polymeric material from coming out of said mold through said second holes, first means operable after insertion of said probes into said mold for causing steam to be injected into said mold through said probes, and second means operable to retract said probes from said mold after steam is injected into said mold whereby said material is expanded into the shape of said mold.

2. Automatic apparatus for forming foamed polymeric structures from expandable polymeric material, comprising a hollow substantially rectangular mold having a top that is movable vertically up and down and a bottom that is movable horizontally adjacent said top to a fixed position under said top, said bottom having first and second opposite sides, said first side having at least one first hole therethrough, said second side having second holes therethrough, an air actuated means for forcing said expandable polymeric material through said first hole so as substantially to fill said mold with said expandable polymeric material, a plurality of hollow steam probes each having an inlet and a plurality of spaced apart small third outlet holes, said third outlet holes communicating with said mold when said probes are inserted therein and said probes preventing said expandable polymeric material from coming out of said mold through said second holes when said probes are inserted in said mold, first means for reciprocating said steam probes into and out of said mold through said second holes and second means operable after the insertion of said probes into said mold for causing steam to flow through said probes and out said third outlet holes under a substantially constantly controlled pressure thereby to expand said material into the shape of said mold, said first means being operable to retract said probes from said mold after steam is flowed through said probes whereby said material is heated to its softening point but below its melting point.

3. The invention of claim 2 wherein said first means is an air actuated means that retracts said probes from said mold rapidly enough to permit the expanded material to be substantially free of core holes.

4. The invention of claim 2 wherein said first actuating means is an air actuated means that retracts said probes from said mold at a rate of about eight feet per second.

5. Automatic apparatus for preparing sandwich panels having a core made from expandable polymeric material sandwiched between first and second facing sheets with an adhesive on their adjacent sides, comprising dividers at opposite ends of said sheets for maintaining said sheets in spaced relation, first and second opposite side rails at the opposite side edges of said sheets bridging the space between said sheets at right angles to said dividers so that said first and second sheets with said dividers and said side rails form an enclosed space between said first and second sheets, said first side rail having at least one first hole therethrough and said second side rail having a plurality of second holes therethrough, an air actuated means for forcing said expandable polymeric material through said first hole so as substantially to fill the space between said first and second sheets, a plurality of probes insertable in said space through said second holes thereby to keep said expandable material from coming out of said second holes, first means operable after insertion of said probes into said space for causing steam to flow into said space through said probes, second means operable to retract said probes out of said space after steam is flowed through said probes whereby said expandable polymeric material is expanded against the inside of said first and second sheets and into the shape of said space, third means for supporting said first sheet against the expansion of said expandable polymeric material, and fourth means for supporting said second sheet against the expansion of said expandable polymeric material whereby said expandable polymeric material is uniformly expanded and sandwiched between said first and second sheets.

6. Automatic apparatus for forming sandwich panels having a core made from expandable polymeric material and first and second facing sheets having an adhesive on their adjacent sides, comprising first means for maintaining said first and second sheets in spaced relation, second means at the edges of said first and second sheets and operable therewith for substantially enclosing the space between said first and second sheets, said second means having first and second holes therethrough, third means for substantially filling the space between said first and second sheets with said expandable polymeric material through said first holes, steam probes insertable in said space through said second holes for injecting steam into said space, said steam probes preventing said expandable polymeric material from coming out of said second holes, fourth means operable after the insertion of said steam probes into said space for causing steam to flow into said space through said steam probes thereby to expand said expandable polymeric material against said first and second sheets, fifth means operable to retract said steam probes from said space after steam is injected into said space, and sixth means on the outside of said first and second sheets for resisting the expansion of said expandable polymeric material against said first and second sheets.

7. In a method for preparing an integral low density cellular polymeric material having uniform small voids the steps comprising partially inserting steam probes into a molding cavity through holes in the side of said cavity, blowing partially expanded polymeric particles capable of further expansion into said cavity through other holes in said cavity so as substantially to fill said molding cavity with said particles while said probes substantially prevent said particles from being blown out of said molding cavity, further inserting said probes substantially all the way into said cavity, injecting steam into said cavity, and after the elapse of a length of time simultaneously stopping said steam injection and removing said probes from said cavity at a rate of about 8 feet per second, whereby said particles are heated to a temperature wherein softening and expansion occur in said particles so that said particles take the shape of said cavity.

8. In a method for preparing a sandwich type panel structure comprised of a low density polymeric material having uniform small voids interposed between and affixed to sheets of facing material having an adhesive applied to their adjacent faces, the steps of closing said sheets of facing with side rails having holes therethrough and end rails to form a molding cavity, inserting steam probes into said molding cavity through the holes in one of the side rails, blowing expandable polymeric particles evenly into said cavity through the holes in the other of said side rails so as to substantially fill said molding cavity with said particles while said probes substantially prevent said particles from being blown out of said molding cavity, injecting steam into said cavity through said probes for about 3 to about 15 seconds, and then simultaneously shutting off said steam injection and removing said probes from said cavity at a speed sufficient to enable the residual heat to expand the polymeric material so as to form a continuous structure.

9. Automatic apparatus remotely controlled for forming sandwich panels having a core made from expandable polymeric material and first and second facing sheets having an adhesive on their adjacent sides comprising a mold having movable top and bottom portions and sides, said sides having first and second holes therein, means for maintaining said first and second facing sheets in spaced relation between said top and bottom portions of said mold, a plurality of hollow steam probes, first means for inserting said probes through said first holes, control means operable to cause said first means to insert said probes part way into said mold and between said facing sheets and then to cause said first means to further insert said probes into said mold, second means for charging said expandable polymeric material into said mold through said second holes so as to substantially fill said mold with said expandable polymeric material while said probes are inserted part way into said mold to substantially prevent said material from coming out of said mold through said first holes, said probes being further inserted into said mold after said mold is substantially filled, third means operable upon said further insertion of said probes into said mold for injecting steam into said mold through said probes so as to heat said expandable polymeric material thereby to cause expansion thereof against said facing sheets, and fourth means operable upon said further insertion of said steam probes into said cavity for initiating a time delay cycle, said first means being responsive to said fourth means after the termination of said time delay cycle for retracting said probes from said mold whereby large polymeric sandwich panels can be mass produced rapidly and uniformly by remote control.

10. Automatic apparatus remotely controlled for forming foamed polymeric structures from expandable polymeric materials by the use of steam comprising a mold having movable top and bottom portions and sides, said sides having first and second holes therein, a plurality of hollow steam probes, first means for inserting said probes through said first holes, control means to cause said first means to insert said probes part way into said mold so as to substantially close said mold and then to cause said first means to further insert said probes into said mold, second means for charging said expandable polymeric material into said mold through said second holes when said cavity is substantially closed so as to substantially fill said mold with said expandable polymeric material while said probes substantially prevent said material from coming out of said mold through said first holes, said probes being further inserted into said mold after said mold is substantially filled, third means operable after said further insertion of said probes into said mold for injecting steam into said mold through said probes when said mold is substantially filled so as to heat said expandable polymeric material thereby to cause expansion thereof into the shape of said mold and fourth means operable after said further insertion of steam probes into said cavity for initiating a time delay cycle, said first means being responsive to said time delay cycle for retracting said probes from said mold whereby large polymeric structures can be mass produced rapidly and uniformly by remote control.

References Cited in the file of this patent

UNITED STATES PATENTS

| | | |
|---|---|---|
| 1,540,219 | Myers | June 2, 1925 |
| 1,863,854 | Jeffery | June 21, 1932 |
| 1,905,929 | Matthias | Apr. 25, 1933 |
| 1,977,374 | Brooke et al. | Oct. 16, 1934 |
| 2,124,733 | Decker | July 26, 1938 |
| 2,250,697 | Bassett | July 29, 1941 |
| 2,317,823 | Strauss | Apr. 27, 1943 |
| 2,490,765 | Abbott | Dec. 13, 1949 |
| 2,530,289 | Cook | Nov. 14, 1950 |
| 2,536,506 | Kleber | Jan. 2, 1951 |
| 2,661,496 | Lubenow | Dec. 8, 1953 |
| 2,699,572 | Soderquist | Jan. 18, 1955 |
| 2,731,699 | Dubbs | Jan. 24, 1956 |
| 2,744,042 | Pace | May 1, 1956 |
| 2,757,415 | Mathnes et al. | Aug. 7, 1956 |
| 2,770,406 | Lane | Nov. 13, 1956 |
| 2,806,812 | Merz | Sept. 17, 1957 |

OTHER REFERENCES

Plastic Technology, Fabrication Methods for Expandable Polystyrene, July 1956, pp. 452–455.

Koppers booklet, "Dylite-Expandable-Polystyrene," a new foam material, 1954, pp. 19, 21, 24, 26.